United States Patent
Levy et al.

(10) Patent No.: US 7,822,756 B1
(45) Date of Patent: Oct. 26, 2010

(54) STORING DOCUMENT-WIDE STRUCTURE INFORMATION WITHIN DOCUMENT COMPONENTS

(75) Inventors: Philip Levy, Los Altos, CA (US); Abhishek Shrivastava, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 425 days.

(21) Appl. No.: 11/069,690

(22) Filed: Feb. 28, 2005

(51) Int. Cl.
*G06F 7/00* (2006.01)
*G06F 17/30* (2006.01)

(52) U.S. Cl. ................................... 707/756
(58) Field of Classification Search ................ None
See application file for complete search history.

(56) References Cited

U.S. PATENT DOCUMENTS

| | | | |
|---|---|---|---|
| 6,189,019 B1 | 2/2001 | Blumer et al. | |
| 6,542,635 B1 | 4/2003 | Hu et al. | |
| 6,694,053 B1 | 2/2004 | Burns et al. | |
| 2001/0018697 A1* | 8/2001 | Kunitake et al. | 707/517 |
| 2004/0205671 A1 | 10/2004 | Sukehiro et al. | |
| 2005/0005263 A1 | 1/2005 | Miyazaki | |

OTHER PUBLICATIONS

Yoshikawa et al., "XRel: A Path-Based Approach to Storage and Retrieval of XML Documents using Relational Databases", ACM Transactions on Internet Technology, 2001).*
Baumgartner et al., "Visual Web Information Extraction with Lixto", Proceedings of the 26th VLDB Conference, 2001, ACM.*

* cited by examiner

*Primary Examiner*—Neveen Abel Jalil
*Assistant Examiner*—Michael J Hicks
(74) *Attorney, Agent, or Firm*—Robert C Kowert; Meyertons, Hood, Kivlin, Kowert & Goetzel, P.C.

(57) ABSTRACT

One embodiment of the present invention provides a system that facilitates disassembling a structure tree containing structure information for a document. During operation, the system assigns unique identifiers to nodes in the structure tree. The system also selectively labels each node in the structure tree with a unique pathname from the root of the structure tree, wherein in the pathname specifies the position of the node in the structure tree. Next, the system merges nodes from the structure tree into components of the document, which contain content items for the document, instead of storing the structure tree separately from the components. In this way, the components can be incorporated into or extracted from the document without losing associated structure information for the document.

18 Claims, 4 Drawing Sheets

STORING DOCUMENT-WIDE STRUCTURE INFORMATION WITHIN DOCUMENT COMPONENTS

BACKGROUND

1. Field of the Invention

The present invention relates to techniques for representing and manipulating documents within a computer system. More specifically, the present invention relates to a method and an apparatus for storing document-wide structure information within document components (such as pages of the document), which contain content items for the document.

2. Related Art

Adobe® Portable Document Format (PDF) is a publicly available specification used by millions of people worldwide to facilitate secure and reliable distribution of electronic documents. Adobe PDF is widely used by enterprises and governments to effectively streamline document management, increase productivity, and reduce reliance on paper.

PDF files can contain a number of different types of information. In particular, a PDF file can contain: (1) the page content itself; and (2) the structure information that describes the logical organization of content that appears on the pages. This structure information is presently represented as a "structure tree," which is a single, document-wide data structure that represents the logical structure of the entire document, and which is stored separately from the page contents. (Note that some structure information can also appear on the individual pages.) Within the document pages, content items related to the structure tree are stored in "marked content containers," which wrap content items and facilitate connections between the structure tree and page content through the use of marked content ids.

This separation of the structure tree from page content allows the ordering and nesting of logical elements to be entirely independent of the order and location of content items on document pages. However, when documents are assembled or disassembled at the page level (that is, pages are added or extracted), there is presently no way to attach or join the structure information. Consequently, the associated structure information is typically lost.

Hence, what is needed is a method and an apparatus that facilitates adding or extracting pages from a document, such as a PDF document, without losing the associated structure information.

SUMMARY

One embodiment of the present invention provides a system that facilitates disassembling a structure tree containing structure information for a document. During operation, the system assigns unique identifiers to nodes in the structure tree. The system also selectively labels each node in the structure tree with a unique pathname from the root of the structure tree, wherein in the pathname specifies the position of the node in the structure tree. Next, the system merges nodes from the structure tree into components of the document, which contain content items for the document, instead of storing the structure tree separately from the components. In this way, the components can be incorporated into or extracted from the document without losing associated structure information for the document.

In a variation on this embodiment, a given node in the structure tree can be associated with one or more content items in the document.

In a variation on this embodiment, assigning unique identifiers to nodes in the structure tree involves performing a depth first search through the structure tree. During this process, the system assigns sequential identifiers to nodes as they are encountered.

In a variation on this embodiment, the components of the document are pages of the document. In a further variation, merging nodes from the structure tree into components of the document involves processing pages in the document from beginning to end to find content items that are marked to indicate they are associated with the structure tree. While doing so, the system maintains a counter to keep track of the last node that was transformed.

For each marked content item found on a page, the system locates an associated parent node in the structure tree. If the structure-order of the content item is the same as its content-order, the system: transforms the structure tree sub-hierarchy between the last-transformed node and the parent node of the content item; and updates the counter for the last-transformed node. On the other hand, if the structure-order of the content item is different from its content-order, the system: transforms the corresponding parent node; attaches tree pathname information to the corresponding parent node; and leaves the counter for the last-transformed node unchanged. Finally, if the parent node is the same as the last-transformed node, the system: takes no action; and leaves the counter for the last-transformed node unchanged.

In a variation on this embodiment, the system reassembles the structure tree from information contained within components of the document. This involves traversing each page in the document from beginning to end to locate nodes from the structure tree. If a located node is not associated with tree pathname information, the located node is inserted into the structure tree at a position obtained from the nest level of the located node. Otherwise, if a located node is associated with tree pathname information, the located node is inserted into the structure tree based on a lexical sort order position obtained from the tree pathname.

DETAILED DESCRIPTION

Figure 1:
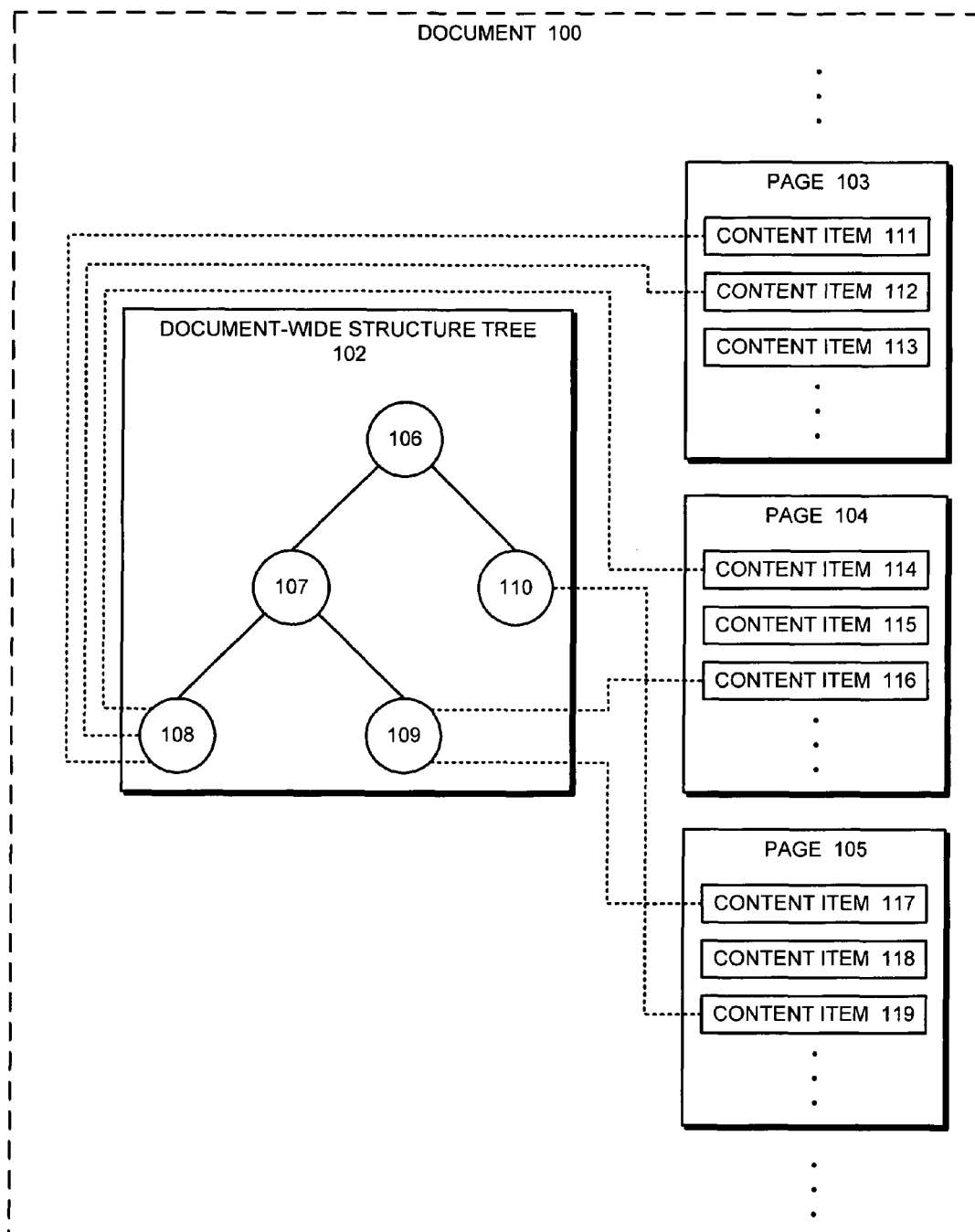
FIG. 1 illustrates a document which contains a structure tree.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Overview

One embodiment of the present invention facilitates disassembling a document wide-structure tree and representing all of the structure information at the page level, so that extraction and merge operations on pages can be done without loss of structure information. This embodiment also provides a technique to reassemble the original structure tree without loss of structure information from the compact and minimal structure information that is stored on each page.

Note that a structure tree is a data structure which defines the structure of a document. For example, a document can be broken up into chapters, which are divided into sections, wherein the sections are themselves divided into paragraphs. A structure tree for such a document can have a root node for the document, and this root node can have child nodes for chapters. Each chapter node can have child nodes for sections, and each section node can have child nodes for paragraphs.

The structure information which is stored in the pages is represented in an intuitive way that has a predictable behavior. This enables someone who is generating content to be merged into an existing document, to create the structure information in a way that will predictably blend with the existing structure of the document, without the need to change identifiers or numbering of the existing structure information. If a document is reassembled with pages missing (for example, if all but certain pages are placed into a new document), the structural flow can again be reassembled in a predictable and logical way, so that the structural flow of the document remains intact. (For example, if chapter 3 is removed, chapter 4 will immediately follow chapter 2).

The document-wide structure tree is dismantled and relevant information is distributed onto the pages using the following general approach. First, nodes in the structure tree are all assigned unique identifiers. Next, nodes are also labeled with the tree pathname from the root to the node, which represents the position of the node in the structure tree. Then, the structure tree nodes are transformed (using an approach described in following sections) and merged with the page contents. This can be done in such a way that the structure node hierarchy provides an outline for the page, with page contents interspersed through out this outline. The nesting level of a page content item can be used to determine its position in original structure tree. Furthermore, tree pathname information can be used to distinguish cases where the content order of a content item differs from its structure tree order, and also cases where a structure node has content spread over multiple pages.

The combination of transformed structure node hierarchy and unique root-to-leaf pathnames provides enough information to fully reassemble the original structure tree. The reassembly process can make use of the nesting level of transformed structure nodes and content items to determine the correct location for the nodes in the structure tree. It can also make use of the tree pathname information to override the nesting level, and to merge structure nodes across pages.

Hence, the present invention enables structure information to be associated with an individual page and to travel with the page. This has a number of advantages. Pages can be created with structure that will merge with existing structure, and pages from different structured documents can be merged in a way that correctly merges structure information.

The above-described system is presented in more detail below with reference to FIGS. 1-4.

Document Containing a Structure Tree

FIG. 1 presents an exemplary document 100, such as a PDF document, which contains a document-wide structure tree 102. Document 100 also includes a number of pages 103-105, which each contain a number of content items. More specifically, page 103 includes content items 111-113, page 104 contains content items 114-116, and page 105 contains content items 117-119. Content items 111-119 can include any type of textual, graphical, or other type of content that can be part of a document.

Document-wide structure tree 102 can generally include any type of data structure (whether it is a tree or not) that specifies the logical structure of document 100. In FIG. 1, document-wide structure tree 102 is comprised of a number of nodes 106-110, wherein each node can be associated with one or more content items located in pages of the document.

Referring to the example illustrated in FIG. 1: node 108 is associated with content items 111 and 112 in page 103 and content item 114 in page 104; node 109 is associated with content item 116 in page 104 and content item 117 in page 105; and node 110 is associated with content item 119 in page 105. Nodes 106 and 107 might be associated with content items in other pages, but these associations are not illustrated in FIG. 1.

Although the present invention describes how document structure nodes can be integrated into "pages" of the document, the present invention is not meant to be limited to integrating structure nodes into document "pages." In general, the present invention can integrate structure nodes into any document component, which contains content items. For example, instead of integrating the nodes into pages, the nodes may be integrated into paragraphs, chapters or sections of the document.

Document with Structure Tree Incorporated into Pages of the Document

Figure 2:
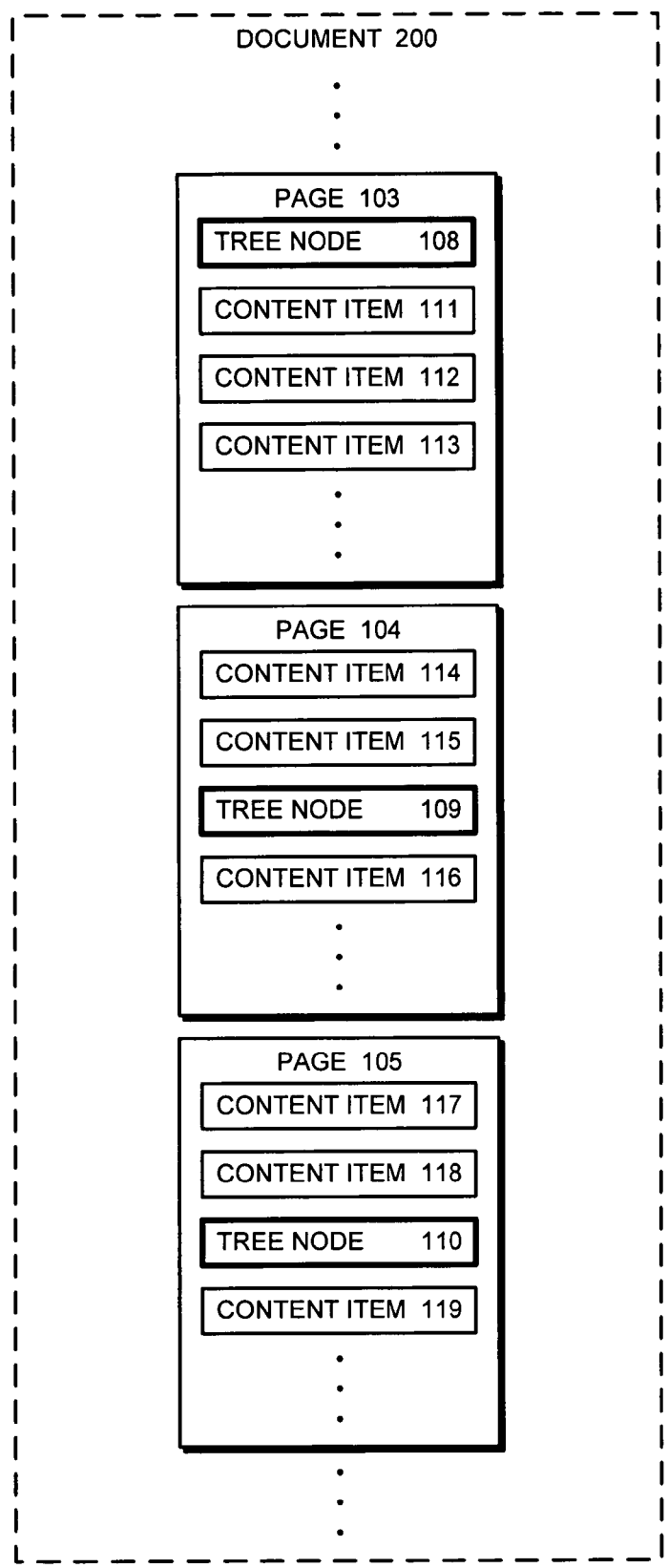
FIG. 2 illustrates a document wherein nodes of the structure tree are incorporated into pages of the document in accordance with an embodiment of the present invention.

FIG. 2 illustrates a "transformed" document, wherein nodes of the structure tree have been merged into pages of the document in accordance with an embodiment of the present invention. In this embodiment, a separate document-wide structure tree does not exist. Instead, the structure tree nodes have been incorporated into pages of the document in a manner that allows the structure tree to be reconstructed from the nodes if necessary. More specifically: page 103 includes tree node 108, which is located before content item 111: page 104 includes tree node 109, which is located between content item 115 and content item 116; and page 105 contains tree node 110, which is located between content item 118 and content item 119.

The process of incorporating tree nodes into document pages is described in more detail below with reference to FIG. 3.

Process of Disassembling Structure Tree

Figure 3:
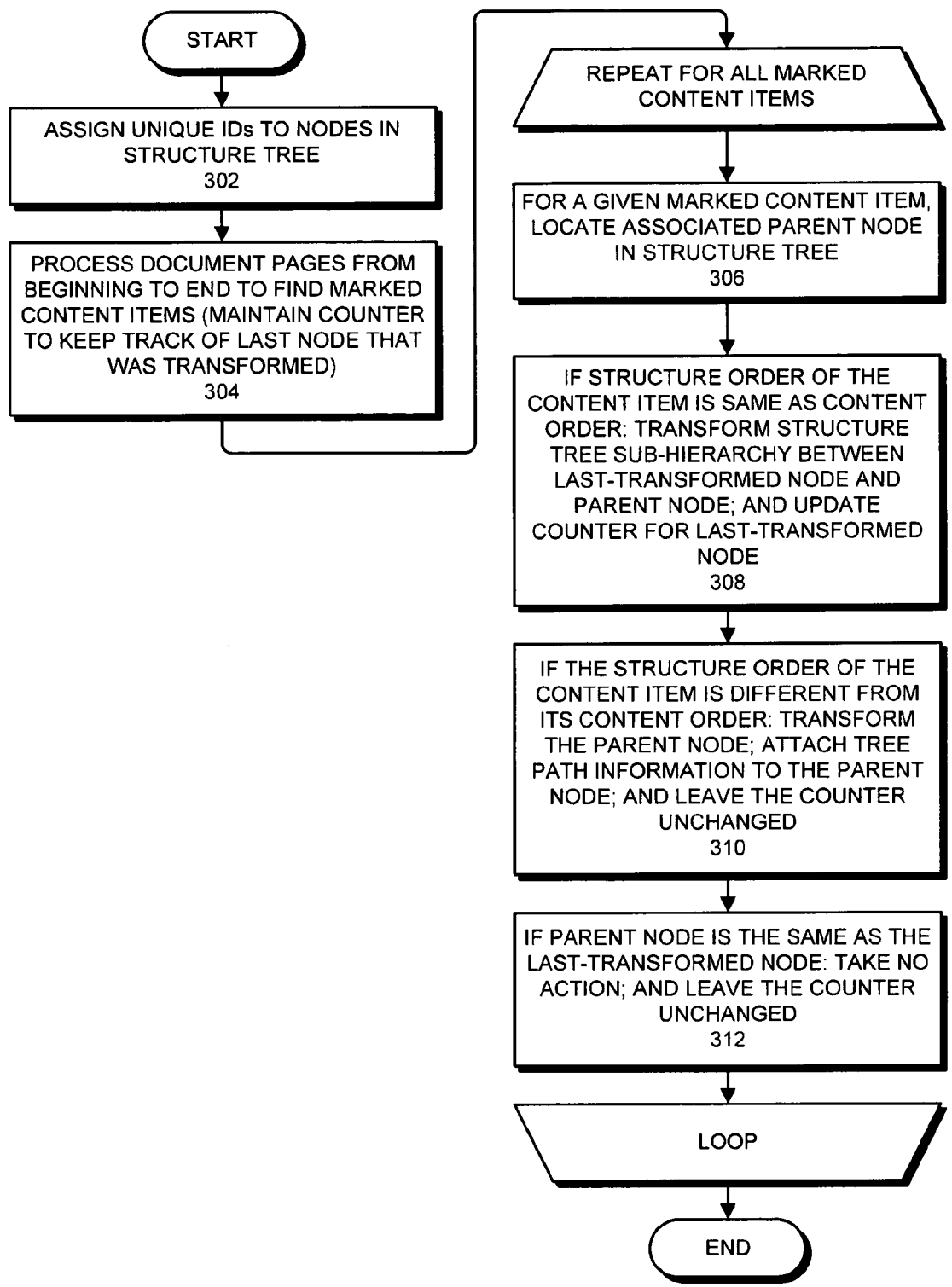
FIG. 3 presents a flow chart illustrating the process of disassembling a structure tree in accordance with an embodiment of the present invention.

FIG. 3 presents a flow chart illustrating the process of disassembling a structure tree in accordance with an embodiment of the present invention. The process begins with a document, which includes pages containing content items and a separate document-wide structure tree as is illustrated in FIG. 1. The system starts by assigning unique identifiers to nodes in the document-wide structure tree (step 302). In one embodiment of the present invention, this involves performing a depth-first search through the nodes of the structure tree, and assigning identifiers to nodes as they are encountered. During this depth first search, each node is also assigned a root-to-leaf tree pathname from the root to the node.

Next, the system processes pages of the document from beginning to end to find content items in the document, which have been marked to indicate they are associated with a node in the structure tree. While doing this, the system maintains a counter to keep track of the last node that was transformed.

For each marked content item that is found, the system locates an associated parent node in the structure tree (step 306).

Next, a number of options exist. If the structure order for a content item (as defined by the order of a corresponding tree node in the structure tree) is the same as its content order, the system transforms the structure tree sub-hierarchy between the last transformed node and the parent node. The system also updates the counter for the last-transformed node (step 308).

On the other hand, if the structure-order for this content item is different than its content order, the system: transforms the parent node associated with the content item; attaches tree path information for the parent node to the content item; and leaves the counter for the last-transformed node unchanged (step 310).

Finally, if the parent node is the same as the last-transformed node, the system takes no action and leaves the counter for the last-transformed node unchanged (step 312).

Note that steps 308-312 are repeated for each marked content item that is found.

Process of Assembling Structure Tree

Figure 4:
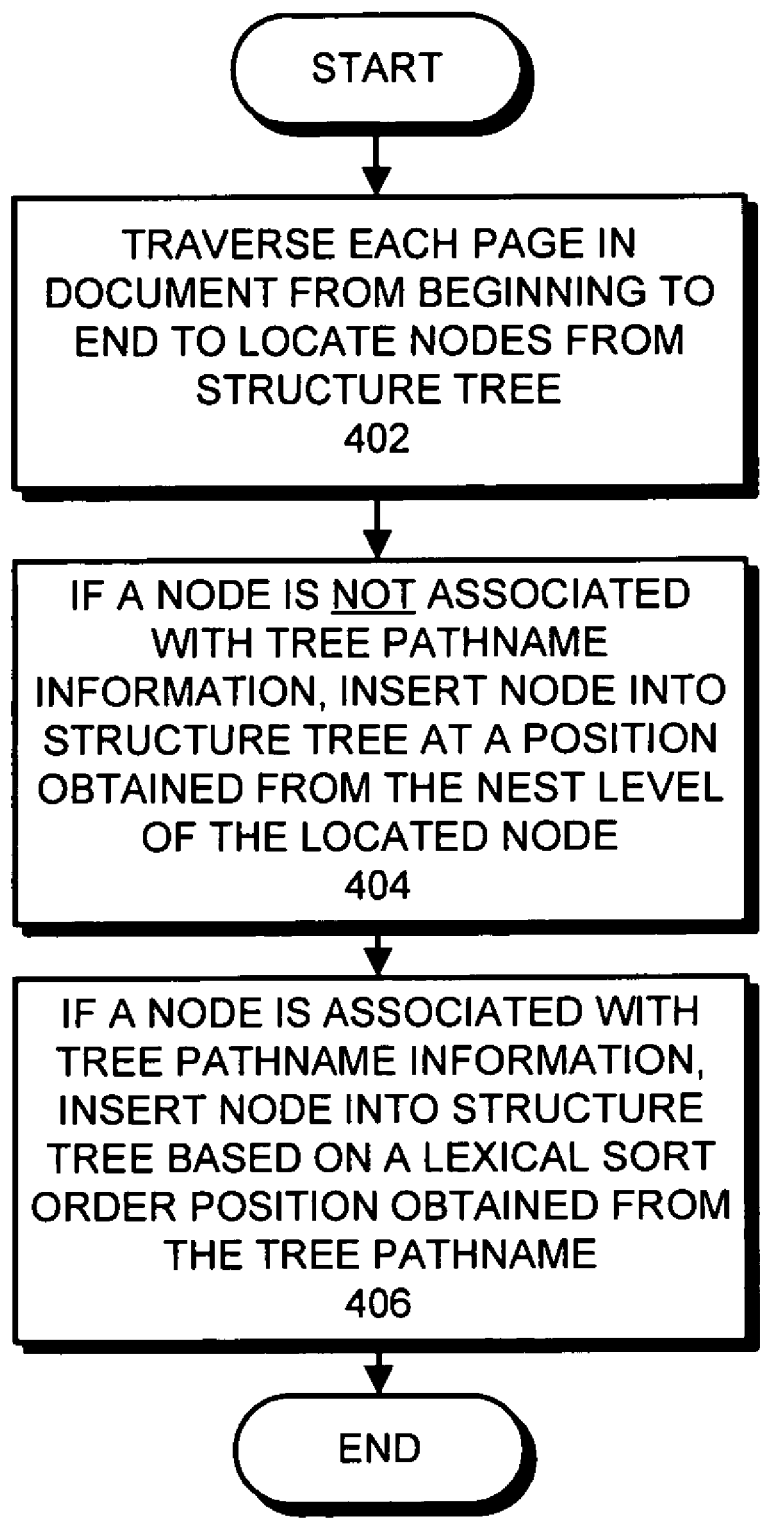
FIG. 4 presents a flow chart illustrating the process of reassembling the structure tree in accordance with an embodiment of the present invention.

FIG. 4 presents a flow chart illustrating the process of reassembling the structure tree in accordance with an embodiment of the present invention. The process starts with a document, wherein pages of the document contain structure tree nodes as is illustrated in FIG. 2.

The system starts by traversing each page in the document from beginning to end to locate nodes from the structure tree (step 402). If a located node is not associated with tree pathname information, the system inserts the located node into the structure tree at a position obtained from the nest level of the located node, thereby maintaining its hierarchy information (step 404). Otherwise, if the located node is associated with tree pathname information, the system inserts the node into the structure tree based on a lexical sort order position obtained from the tree pathname (step 406).

Inserting a Node into the Structure Tree Based on Lexical Sort Order

The process of inserting a node into a structure tree based on lexical sort order position (described above), can be accomplished as follows. Consider a document which is divided into chapters, wherein chapters are divided into sections, and wherein sections are divided into paragraphs. A structure tree for such a document can have a root node for the document, and this root node can have child nodes for chapters. Each chapter node can have child nodes for sections, and each section node can have child nodes for paragraphs.

In this example, the system treats the pathnames used to label each structure node as a string. When inserting a new node into the structure tree, the system processes the pathname from left to right. In doing so, the system places the node under an existing tree node whose path name matches the longest prefix of the path name of the node being inserted. If no nodes match, the system places the node at the end of the structure tree under a new top-level root node. If prefixes of one or more nodes do match, the system places the new node in lexical sort order under the right-most matching prefix node.

For example, given the following pathnames on structure nodes:
- chapter1.section1.para1
- chapter1.section1.para2
- chapter1.section3.para1 the resulting tree is:
- chapter1
- section1
- para1
- para2
- section3
- para1

If the content item "chapter1.section2.para1" is added, the tree becomes:
- chapter1
- section1
- para1
- para2
- section2
- para1
- section3
- para1

If the content item "chapter3.section1.para1" is added, the tree becomes:
- chapter1
- section1
- para1
- para2
- section2
- para1
- section3
- para1
- chapter3
- section1
- para1

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for disassembling a structure tree containing structure information for a document, comprising:
    labeling nodes in the structure tree with a unique pathname from the root of the structure tree, wherein the pathname specifies the position of the node in the structure tree;
    wherein a plurality of nodes within the structure tree correlate to a plurality of the content items in the document, wherein the organization of nodes with the structure tree differs from the organization of content items within the document, wherein the document comprises a plurality of components, wherein each of said components comprises at least one of said plurality of content items;
    storing particular information within each component of one or more components of said plurality of components, wherein the particular information indicates, for one or more content items stored within that component, information for determining a position within the document for that content item; wherein for at least one content item of that component, the respective information for determining a position within the document for the at least one content item includes the unique pathname for a labeled node of the structure tree to which the at least one content item correlates; and extracting a given component of said one or more components to create a distinct extracted component that is no longer part of the document, wherein said extracting comprises extracting said particular information stored within that given component and the respective one or more content items stored within that given component together to create the distinct extracted component, wherein the distinct extracted component includes said particular information and the respective one or more content items.

2. The method of claim 1, further comprising assigning unique identifiers to nodes in the structure tree, wherein assigning unique identifiers to nodes in the structure tree comprises performing a depth first search through the structure tree, and assigning sequential identifiers to nodes as they are encountered.

3. The method of claim 1, wherein the components of the document are pages of the document.

4. The method of claim 3, wherein the method further comprises:

processing pages in the document from beginning to end to find content items that are marked to indicate they are associated with the structure tree, and while doing so maintaining a counter to keep track of a last node that was transformed; and for each marked content item found on a page, locating an associated parent node in the structure tree.

5. The method of claim 4, further comprising:

if a structure-order of the content item is the same as a content-order of that content item, transforming a sub-hierarchy of the structure tree between the last-transformed node and the parent node of the content item, and updating the counter for the last-transformed node;

if the structure-order of the content item is different from the content-order of that content item, transforming the corresponding parent node, attaching tree pathname information to the corresponding parent node, and leaving the counter for the last-transformed node unchanged; and if the parent node is the same as the last-transformed node, taking no action, and leaving the counter for the last-transformed node unchanged.

6. The method of claim 4, further comprising reassembling the structure tree from information contained within components of the document by:

traversing each page in the document from beginning to end to locate nodes from the structure tree;

wherein if a located node is not associated with tree pathname information, the located node is inserted into the structure tree at a position obtained from the nest level of the located node; and wherein if a located node is associated with tree pathname information, the located node is inserted into the structure tree based on a lexical sort order position obtained from the tree pathname.

7. A computer-readable storage medium storing instructions that when executed by a computer cause the computer to perform a method for disassembling a structure tree containing structure information for a document, the method comprising:

labeling nodes in the structure tree with a unique pathname from the root of the structure tree, wherein the pathname specifies the position of the node in the structure tree;

wherein a plurality of nodes within the structure tree correlate to a plurality of the content items in the document, wherein the organization of nodes with the structure tree differs from the organization of content items within the document, wherein the document comprises a plurality of components, wherein each of said components comprises at least one of said plurality of content items;

storing particular information within each component of one or more components of said plurality of components, wherein the particular information indicates, for one or more content items stored within that component, information for determining a position within the document for that content item; wherein for at least one content item of that component, the respective information for determining a position within the document for the at least one content item includes the unique pathname for a labeled node of the structure tree to which the at least one content item correlates; and extracting a given component of said one or more components to create a distinct extracted component that is no longer part of the document, wherein said extracting comprises extracting said particular information stored within that given component and the respective one or more content items stored within that given component together to create the distinct extracted component, wherein the distinct extracted component includes said particular information and the respective one or more content items.

8. The computer-readable storage medium of claim 7, wherein said method further comprises assigning unique identifiers to nodes in the structure tree, wherein assigning unique identifiers to nodes in the structure tree comprises performing a depth first search through the structure tree, and assigning sequential identifiers to nodes as they are encountered.

9. The computer-readable storage medium of claim 7, wherein the components of the document are pages of the document.

10. The computer-readable storage medium of claim 9, wherein said method further comprises:

processing pages in the document from beginning to end to find content items that are marked to indicate they are associated with the structure tree, and while doing so maintaining a counter to keep track of a last node that was transformed; and for each marked content item found on a page, locating an associated parent node in the structure tree.

11. The computer-readable storage medium of claim 10, further comprising:

if a structure-order of the content item is the same as a content-order of that content item, transforming a sub-hierarchy of the structure tree between the last-transformed node and the parent node of the content item, and updating the counter for the last-transformed node;

if the structure-order of the content item is different from the content-order of that content item, transforming the corresponding parent node, attaching tree pathname information to the corresponding parent node, and leaving the counter for the last-transformed node unchanged; and if the parent node is the same as the last-transformed node, taking no action, and leaving the counter for the last-transformed node unchanged.

12. The computer-readable storage medium of claim 10, further comprising reassembling the structure tree from information contained within components of the document by:
    traversing each page in the document from beginning to end to locate nodes from the structure tree;
    wherein if a located node is not associated with tree pathname information, the located node is inserted into the structure tree at a position obtained from the nest level of the located node; and
    wherein if a located node is associated with tree pathname information, the located node is inserted into the structure tree based on a lexical sort order position obtained from the tree pathname.

13. An apparatus that disassembles a structure tree containing structure information for a document, comprising:
    a labeling mechanism configured to label nodes in the structure tree with a unique pathname from the root of the structure tree, wherein the pathname specifies the position of the node in the structure tree;
    wherein a plurality of nodes within the structure tree correlate to a plurality of the content items in the document, wherein the organization of nodes with the structure tree differs from the organization of content items within the document, wherein the document comprises a plurality of components, wherein each of said components comprises at least one of said plurality of content items;
    a storing mechanism configured to store particular information within each component of one or more components of said plurality of components, wherein the particular information indicates, for one or more content items stored within that component, information for determining a position within the document for that content item; wherein for at least one content item of that component, the respective information for determining a position within the document for the at least one content item includes the unique pathname for a labeled node of the structure tree to which the at least one content item correlates; and
    wherein the apparatus is configured to extract a given component of said one or more components to create a distinct extracted component that is no longer part of the document, wherein said extracting comprises extracting said particular information stored within that given component and the respective one or more content items stored within that given component together to create the distinct extracted component, wherein the distinct extracted component includes said particular information and the respective one or more content items.

14. The apparatus of claim 13, further comprising an assignment mechanism configured to assign unique identifiers to nodes in the structure tree, wherein the assignment mechanism is configured to perform a depth first search through the structure tree, and to assign sequential identifiers to nodes as they are encountered.

15. The apparatus of claim 13, wherein the components of the document are pages of the document.

16. The apparatus of claim 15, wherein the apparatus is configured to:
    process pages in the document from beginning to end to find content items that are marked to indicate they are associated with the structure tree, and while doing so maintaining a counter to keep track of a last node that was transformed; and
    for each marked content item found on a page, to locate an associated parent node in the structure tree.

17. The apparatus of claim 16,
    wherein if a structure-order of the content item is the same as a content-order of that content item, the merging mechanism is configured to, transform a sub-hierarchy of the structure tree between the last transformed node and the parent node of the content item, and to update the counter for the last-transformed node;
    wherein if the structure-order of the content item is different from the content-order of that content item, the merging mechanism is configured to, transform the corresponding parent node, attach tree pathname information to the corresponding parent node, and to leave the counter for the last-transformed node unchanged; and
    wherein if the parent node is the same as the last-transformed node, the merging mechanism is configured to, take no action, and to leave the counter for the last-transformed node unchanged.

18. The apparatus of claim 17, further comprising a reassembly mechanism configured to reassemble the structure tree from information contained within components of the document, wherein the reassembly mechanism is configured to:
    traverse each page in the document from beginning to end to locate nodes from the structure tree;
    wherein if a located node is not associated with tree pathname information, the located node is inserted into the structure tree at a position obtained from the nest level of the located node; and
    wherein if a located node is associated with tree pathname information, the located node is inserted into the structure tree based on a lexical sort order position obtained from the tree pathname.

* * * * *